No. 3,514,952
VARIABLE BYPASS TURBOFAN ENGINE
Howard E. Schumacher and Jack Richens, Dayton, and Marvin F. Schmidt, Xenia, Ohio, assignors to the United States of America as represented by the Secretary of the Air Force
Filed July 1, 1964, Ser. No. 380,121
Int. Cl. F02h 7/06
U.S. Cl. 60—225                                   1 Claim The invention described herein may be manufactured and used by or for the United States Government for governmental purposes without payment to us of any royalty thereon.

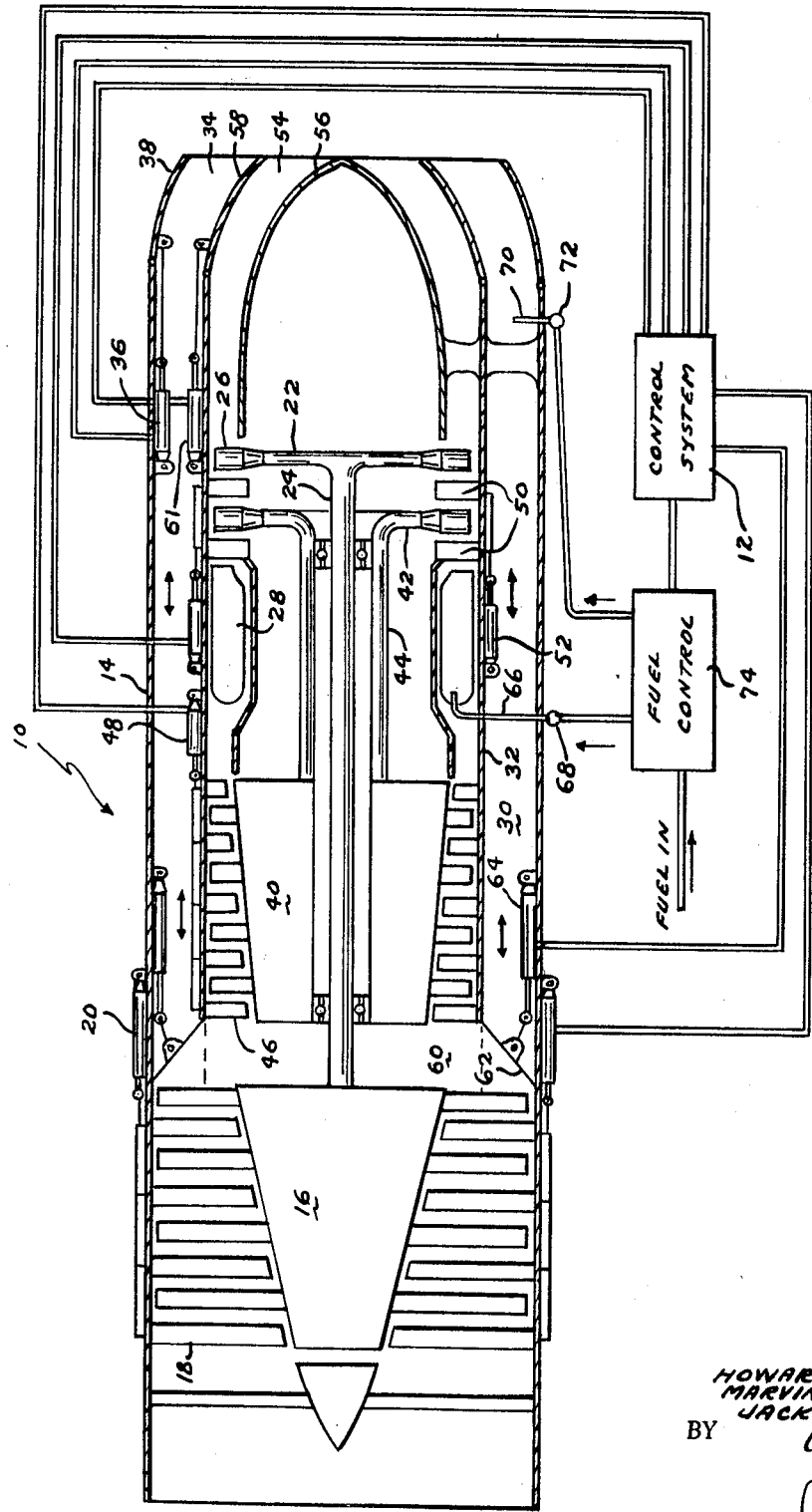

This invention relates to improvements in turbofan engines which are also known as bypass engines. More specifically, this invention relates to the control of the bypass air in a manner permitting more efficient engine operation during the various flight conditions encountered. These flight conditions will vary from subsonic to supersonic flight speeds, and at various power thrust level settings.

Current state of the art turbofan engines are designed so that the fan stages are capable of pumping more air than the compressor stages in the power section are capable of accepting. This excess air is exhausted through a nozzle, and thrust is derived therefrom. The turbofan engine is designed primarily for use in the upper range of subsonic flight speeds. Current turbofan engines, by their nature, produce an ever increasing ratio of excess air in relation to the main compressor air flow with increaing flight speed. The air flow delivered by the fan stages (bypass ratio) becomes detrimental at supersonic flight speeds because the thrust derived from the excess air is not sufficient to offset its cost of production measured in terms of fuel consumption. The magnitude of the bypass ratio at any given flight speed is dependent upon the size relationship between various engine components.

As the flight speed is increased, the temperature of the incoming air increases in direct proportion to the square of the Mach number, while the pressure increases approximately by the seventh power of the Mach number. Since the density of the air, and therefore the mass flow, is directly proportional to the pressure and inversely proportional to the temperature, the quantity of air flowing through the turbofan portion of the engine will be an ever increasing amount with increasing flight speed at any constant altitude. As the temperature of the air increases with the flight speed, the turbine inlet temperature and the engine entrance temperature approach each other in value. When this condition occurs, that is, when engine inlet temperature approaches turbine inlet temperature, sufficient energy is not available for conversion into work for drawing in excess air and for pressuring the air and converting it into thrust by expansion through a nozzle.

Current state of the art engine turbines are efficient only at matched conditions, such as at a given flight speed at a given altitude. For example: the components in the TF 33 engine are matched at Mach .8 in the tropopause. At this flight condition, the TF 33 engine has sufficient cycle energy to allow some of this energy to be converted into turbine energy available for drawing in a large amount of excess air, compress it and expand the compressed air through a nozzle to derive an excess thrust for a given amount of fuel. However, as previously stated, this favorable balance is destroyed as the flight speed is increased.

This dictates that at the higher flight speeds (Mach 2 to 3 plus) with turbine inlet temperatures on the order of 3000° F., the desired cycle is a straight turbojet; whereas in the subsonic speed regime (engine inlet temperature much lower than turbine inlet temperature) the desired cycle is the bypass or turbofan engine.

In accordance with the preent invention, and in order to overcome the deficiency of the present turbofan engine, the air flow from the fan duct is increasingly diverted into the main compressor so as to exhibit a decreasing bypass ratio with increasing flight speed. Furthermore, depending upon proper component size relationship, this engine may be capable of operating as either a turbofan or as a turbojet regardless of flight speed.

The accompanying drawing shows in schematic an engine designed in accordance with the principles of this invention; and capable of accomplishing the above enumerated objectives.

Referring to the drawing, the engine 10, which is made in accordance with this invention, is governed by a control system 112. The control system, which does not constitute a portion of this invention, is shown in block box form only, and is shown with various signal lines communicating with various engine component positioning devices.

The engine 10 is provided with an outer casing 14, which at its forward end includes a first compressor spool or fan 16 which, for purposes of illustration, is shown to be a four stage structure. The stator blades 18 are adjustable as to angular position in a manner well known to the art by any convenient means such as the hydraulic servomotor 20 governed by the control system 12. The compressor spool 16 is driven by an aft or second turbin wheel 22 through connecting shaft 24. Spaced about the periphery of turbine wheel 22 are a plurality of turbine blades 26 which are driven by the hot gas emitting from the first combustion apparatus 28. A portion of the first compressor discharge air is normally delivered into one or more bypass ducts 30 formed in the annular space between the outer casing 14 and the inner casing 32. The compressor discharge air flowing through the bypass ducts is delivered to an afterburner section from which it is discharged through the outer variable area discharge nozzle 34, which is positioned by servomotor 36, which controls flaps 38 to vary the effective nozzle discharge area.

A second compressor spool 40 is mounted to the rear of the first compressor spool 16 and is positioned to ingest that portion of the compressor dicharge air from the first compressor which is not bypassed into the bypass ducts 30. The second compressor spool 40 is driven by a forward or first turbine wheel 42 which is connected to the compressor spool 40 by means of a hollow connecting shaft 44 which coaxially surrounds connecting shaft 24 on which it is supported by suitable bearing means. The first turbine wheel 42 is axially in front of the second turbine wheel 22 and has blades similar to the turbine blades 26 on turbine wheel 22. The stator blades 46 controlling the air flow to the blades of the second compressor, are adjustable as to angular position by means of servomotor 48 governed by the control system 12. In connection with the turbine section of the engine, the turbine stator blades 50 are controlled in a manner similar to the stator blades at the compressor section by means of servomotor 52 which is governed by control system 12.

The hot gases discharged from the turbine section pass through a variable area convergent exhaust nozzle 54 defined by the annular space between the tail cone 56 and the adjustable multiple flaps 58 which are interconnected for common radial adjustment by means of servomotor 61 which is governed by control system 12.

It is noted that the convergent exhaust nozzle 54 controls the discharge of gas flowing through the turbine section of the engine. It is further noted that the outer variable discharge nozzle 34 is concentric with the nozzle 54 and discharges the gas flowing through the bypass ducts 30. The flaps 38 may be radially moved to contact flaps 58 and thus completely cut off any flow of gas. It is thus seen that one means for controlling the flow of gas in the bypass ducts 30 is by means of the exhaust nozzle 34. The flaps 38 controlling the variable area of nozzle 34 may be positioned to any intermediate position between fully opened and closed. The bypass ducts 30 may be built into a single annular passage, suitably supported, or may be one or more "stove pipes" joining to the outer discharge nozzle.

The engine area between the first compressor spool 16 and the second compressor spool 40 provides an annular vane-free transition chamber 60 which forms a flow chamber between the compressors. The inlet end of the bypass ducts 30, which connect with transition chamber 60, are controlled by valve means comprising radially movable bypass flaps 62 which are shown pivotally joined to the inner casing 32. The flaps are all interconnected by means well known to the art and are actuated by servomotor 64. It is thus seen that a second means is provided for controlling the flow of air through the bypass ducts. It becomes obvious that a third control means has been provided for controlling the flow of air through the bypass ducts; namely, the bypass flaps 62 and the outer variable discharge nozzle 34 in combination.

The first combustion apparatus 28 is fueled through a plurality of fuel nozzles 66 joined to a fuel manifold 68. The afterburner section of the engine contains a second combustion apparatus comprising a plurality of spray nozzles 70 joined to a fuel manifold 72. Both the first and the second combustion apparatuses are selectively and variably supplied with fuel to meet engine operating conditions through fuel control 74 which is shown integrated to control system 12.

When the bypass flaps 62 are in the closed position shown, all flow into the bypass ducts is blocked and the entire output of the first compressor is directed into the second compressor from which it passes through the combustion section, the turbine section, and is discharged through nozzle 54. When this cycle is used, the engine operates as a pure jet engine. This same pure jet engine operation may be attained when the bypass flaps 62 are in their open position, as indicated by dotted lines, and the outer variable area discharge nozzle 34 is closed by control flaps 38, as previously described.

When the bypass flaps 62 are moved to the horizontal position indicated by the dotted lines while the outer variable area discharge nozzle 34 is open, the air output from the first compressor is divided, and a predetermined maximum percentage thereof is passed through the bypass ducts and discharged through nozzle 34. When this cycle is used, the engine operates as a conventional turbofan engine.

The novelty of the present engine is not in the two above operating cycles, but rather in the ability of the engine to operate at variable intermediate cycles. The improvement in part power efficiency is keyed to the capability of pumping more air flow through the bypass duct as power reduction is effected. This can be achieved by reducing the back pressure on the first compressor spool 16 by increasing the flow area of the bypass flaps or the outer variable area discharge nozzle to permit more air to flow into the bypass ducts. The flow channels in the second compressor must be adjusted to conform to this flow by area reduction or by density increase. Density regulation can be provided by area adjustment of the turbine stator blades 50 and/or turbine inlet temperature regulation.

The effect of modulating the flow of the bypass air is to vary the bypass ratio and thus influence the propulsive efficiency in such a manner as to be beneficial to the objective requirements of the engine. For cruise power settings, propulsive efficiency of the cycle must be maximized to provide the minimum specific fuel consumption at the selected cruise mission point. This decrease in specific fuel consumption will then be directly translatable to range increases as other engine design parameters are held constant. For an accelerating mode of operating the aircraft, minimum fuel consumed during this operation will occur as a result of maximizing the thrust available to provide an increased margin of excess thrust over the drag of the aircraft. For this operating condition, more air flow through compressor 40 and the turbines is required. This is achieved by decreasing the flow of bypass air to increase the pressure at the front face of compressor 40. Since the mass of air flow through compressor 40 is proportional to the pressure level at the compressor inlet, the flow will increase and provide for the increase in thrust level required for acceleration.

At take-off, in order to obtain maximum thrust per pound of air flow, it may be desired to operate as a pure turbojet, in which case flow through the bypass ducts is completely blocked. Operation as a conventional turbofan will in most cases be at aircraft velocity below Mach 1 when it is desired to loiter with minimum fuel consumption. When it is desired to increase flight speed in the range of Mach 1 to Mach 3+, the mode of operation will be to gradually reduce the flow of bypass air toward pure turbojet operation as the limit.

It is to be understood that the embodiment of the present invention as shown and described is to be regarded as illustrative only and that the invention is susceptible to variations, modifications and changes within the scope of the appended claims.

We claim:

1. A variable bypass turbofan engine comprising in combination: a first compressor section having variable stator blades, a transition chamber, a second compressor section having variable stator blades, a first combustion apparatus, a first turbine section having variable stator blades, a second turbine section having variable stator blades, and an exhaust nozzle arranged coaxially for series flow therethrough in the order named, and with said first turbine section rotatably joined to said second compressor section and said second turbine section rotatably joined to said first compressor section; an afterburner section terminating at the rear in a variable area exhaust nozzle coaxially surrounding said exhaust nozzle and adjustable between zero area and full area positions; a bypass duct means joining said transition chamber to said afterburner section; a valve means joined to said bypass duct; the variable area exhaust nozzle on said afterburner section and said valve means, singly and in combination, controlling the flow in said bypass duct between the limits of zero flow and a predetermined maximum percentage of the total flow through said first compressor section; a second combustion apparatus within said afterburner section; means for selectively and variably adjusting the stator vanes in said compressor and said turbine sections; and means for selectively and variably supplying fuel to said first and said second combustion apparatuses.

References Cited

UNITED STATES PATENTS 2,672,726  3/1954  Wolf et al.
2,873,576  2/1959  Lombard.

FOREIGN PATENTS 704,669  2/1954  Great Britain.

SAMUEL FEINBERG, Primary Examiner

U.S. Cl. X.R.

60—39.16, 226, 271